United States Patent [19]

Katsumoto et al.

[11] 4,013,626

[45] Mar. 22, 1977

[54] PROCESS FOR PREPARING POLYPYRROLIDONE WHEREIN POLYPYRROLIDONE IS WASHED WITH 2-PYRROLIDONE

[75] Inventors: Kiyoshi Katsumoto, El Cerrito; Richard A. Wuopio, San Rafael, both of Calif.

[73] Assignee: Chevron Research Company, San Francisco, Calif.

[22] Filed: Mar. 17, 1975

[21] Appl. No.: 559,293

[52] U.S. Cl. .............................. 260/78 P; 260/78 S
[51] Int. Cl.² ...................................... C08G 69/24
[58] Field of Search ........................ 260/78 P, 78 L

[56] References Cited

UNITED STATES PATENTS 3,721,652   3/1973   Barnes .............................. 260/78 P

*Primary Examiner*—Harold D. Anderson
*Attorney, Agent, or Firm*—G. F. Magdeburger; Dix A. Newell; S. Russell LaPaglia

[57] ABSTRACT

An improved process for the production of poly-2-pyrrolidone in which the solid product is washed with monomer to remove the catalyst and the monomer wash, containing catalyst and monomer, is recycled for further polymerization reaction.

6 Claims, 1 Drawing Figure

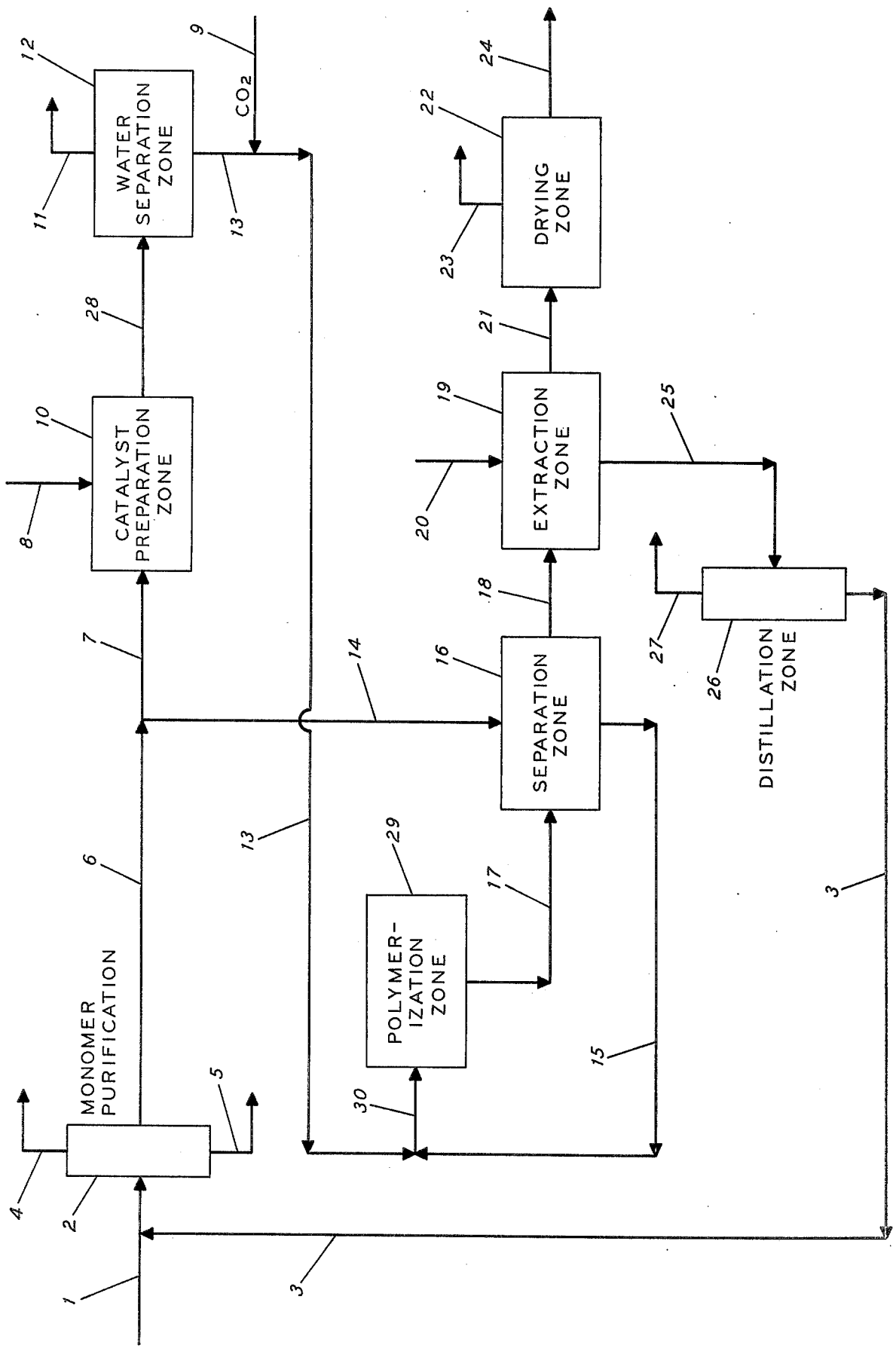

PROCESS FOR PREPARING POLYPYRROLIDONE WHEREIN POLYPYRROLIDONE IS WASHED WITH 2-PYRROLIDONE

BACKGROUND OF THE INVENTION

Poly-2-pyrrolidone (also known as nylon-4) is a polymeric carbonamide of relatively high molecular weight which has recurring amide groups separated by a trimethylene radical as an integral part of the main polymer chain. The polymer is capable of being formed into filaments having substantial orientation along the filamentary axis, high tensile strength, and other properties suitable for mixing into textiles. The polymer can be made into filaments, shaped articles and films by melt spinning, molding and extruding.

Usually, the polymerization of 2-pyrrolidone to poly-2-pyrrolidone involves adding potassium hydroxide to 2-pyrrolidone, distilling off the water of reaction, adding carbon dioxide, charging the reaction mixture to a container or conveyor and reacting at about 50° C. for several hours. The polymer is then recovered by cutting the solid product into manageable pieces and extracting the alkaline polymerization catalyst and excess monomer with water (U.S. Pat. No. 3,721,652). Since polymerization usually proceeds to about 50–70% conversion of monomer, or less, there is appreciable monomer to be recovered from the dilute aqueous washes and the catalyst may be completely lost.

U.S. Pat. No. 2,739,959 discloses the polymerization of 2-pyrrolidone in a non-solvent for the monomer to recover a powdery product from the agitated reaction mixture. U.S. Pat. No. 3,213,066 discloses the carrying out of the polymerization of 2-pyrrolidone in suspension or in bulk in a ball mill to recover a finely divided solid product. In U.S. Pat. No. 3,681,293 and U.S. Pat. No. 3,804,813 the partially solidified reaction mixture is pelletized and the pellets are cured to achieve normal conversion. Each of these processes has the problem of monomer recovery from aqueous washes and catalyst loss.

SUMMARY OF THE INVENTION

A process for producing 2-pyrrolidone polymer advantageously includes the steps of polymerizing 2-pyrrolidone in a reaction mixture containing the monomer and an alkaline polymerization catalyst, at a temperature of from about 18° C to about 100° C for a period of from about 4 to about 100 hours to produce a solid product, and washing said solid product with 2-pyrrolidone to recover a first stream, containing polymer, substantially free of the catalyst, and a second stream containing 2-pyrrolidone and catalyst. The second stream may be recycled for further polymerization reaction.

DESCRIPTION OF PREFERRED EMBODIMENTS

In the present invention 2-pyrrolidone is catalytically polymerized at a temperature of about 18°–100° C for about 4–100 hours to produce a solid product. Catalyst and excess or unreacted monomer must be separated from the solid product. Aqueous washing results in loss of the catalyst and contamination of excess monomer with water. To avoid contamination of the excess monomer with water and catalyst loss, the solid product in the process of this invention is washed with 2-pyrrolidone. This novel washing step produces two streams, a first stream, containing polymer, substantially free of catalyst, and a second stream containing 2-pyrrolidone and catalyst. It is found that the catalyst retains its activity and the second stream may be recycled for further polymerization.

In a preferred embodiment of the process, monomer, and alkaline polymerization catalyst are charged to a reactor with agitating means to form the reaction mixture. The mixture is agitated at a temperature from about 25° to about 70° C for a period of from about 8 to about 72 hours to form a solid product. The solid product is separated from the reaction mixture and washed with 2-pyrrolidone to substantially remove catalyst from the polymer. The washing step produces a first stream (containing polymer and substantially free of catalyst), and a second stream containing 2-pyrrolidone and catalyst. The second stream, with make-up quantities of the other components as well as 2-pyrrolidone and catalyst, is recycled to the reactor for further reaction. Optionally, the polymer may be subjected to further purification to remove residual monomer and catalyst as by aqueous washing and drying. Removal of the residual monomer from the aqueous wash by distillation, thin-film evaporation, extraction, or other recovery techniques, completes the monomer recovery.

The process of the present invention is just as applicable to the production of polymers of substituted 2-pyrrolidone, such as 4-methyl-2-pyrrolidone, and copolymers of 2-pyrrolidone such as with caprolactam, as to the production of poly-2-pyrrolidone. Consequently, in general, and unless otherwise indicated, monomer denotes 2-pyrrolidone, substituted 2-pyrrolidone, and any compound capable of copolymerizing with 2-pyrrolidone under conditions of alkaline polymerization catalysis.

In order to produce high-quality poly-2-pyrrolidone capable of being formed into fibers, filaments and yarn of commercial textile quality, it is necessary that the monomer be of high purity. Depending upon the process of manufacture, commercially available 2-pyrrolidone will contain appreciable amounts of various impurities, some of which apparently interfere deleteriously with polymerization. Purification of the monomer to polymerization grade is achieved by crystallization; distillation; distillation from a boron oxide, as disclosed in U.S. Pat. No. 3,806,427; aqueous caustic hydrolysis and distillation, as disclosed in U.S. Pat. No. 3,721,652; acid treatment and distillation, as disclosed in U.S. Pat. No. 3,721,652; and these and other purification techniques in combination.

The alkaline polymerization catalyst is selected from among any of those disclosed in U.S. Pat. Nos. 3,721,652 and 2,638,463, i.e., generally, alkaline polymerization catalysts are made from alkaline compounds including the alkali metals, salts of these metals, hydroxides, alcoholates, carbonates and oxides of the alkali metals, alkaline earth metals and hydroxides, strongly basic organometallic compounds and organic bases such as quaternary ammonium hydroxide (U.S. Pat. No. 2,973,343). The alkali metals are generally effective either in metallic form or in the form of hydrides, borohydrides, oxides, hydroxides, carbonates, alkoxides, amides, etc; and the organometallic compounds include alkali metal hydrocarbyls such as lithium and potassium alkyls and aryls. Of course, mixtures of these compounds also can be employed. The preferred alkaline polymerization catalyst is made from potassium hydroxide.

The preferred alkaline polymerization catalyst is potassium pyrrolidonate. It is preferably made in situ by the addition of potassium hydroxide to more than an equivalent amount of 2-pyrrolidone, but there are numerous other ways of making it, as by the addition of the potassium compounds, or mixtures thereof, enumerated above to 2-pyrrolidone. If KOH is used to prepare the catalyst, it can be added either in solid form or as an aqueous KOH solution (U.S. Pat. No. 3,778,402), the latter lending itself to continuous operation. In either case, after the addition of KOH to 2-pyrrolidone, water is removed to give a substantially anhydrous solution of potassium pyrrolidonate in 2-pyrrolidone. Solid KOH pellets (85% KOH, 15% water) have been employed, as have aqueous KOH solutions having a KOH content of 10–65% by weight. As noted elsewhere, U.S. Pat. No. 3,778,402, the polymerization is sometimes depressed if the period between KOH addition to the pyrrolidone and the removal of water is an extended period. Consequently, in the production of the alkaline catalyst, water is normally removed promptly by distillation under reduced pressure and distillation is normally continued until 2-pyrrolidone begins to distill over.

The polymerization of 2-pyrrolidone is usually carried out in the presence of an activator or initiator of polymerization. Many types of initiators have been suggested, including acyl derivatives, U.S. Pat. No. 2,739,959; N-acyl lactams, U.S. Pat. No. 2,809,958; oxides of Group VI such as $SO_2$, U.S. Pat. No. 3,174,951; halides and oxyhalides, halosilanes, $CS_2$, amides, sulfoamides, isocyanates, $NO_2$, carbonyl halides, etc. Of these, the preferred initiators are $SO_2$ and $CO_2$, or are derived from $SO_2$ or $CO_2$. $CO_2$ is most preferred, U.S. Pat. No. 3,721,652. Of course, mixed initiators may also be utilized.

In the preferred practice of making poly-2-pyrrolidone the alkaline polymerization catalyst is prepared in situ with the monomer to be polymerized as by the addition of less than an equivalent amount of a source of alkali metal to 2-pyrrolidone. Then $CO_2$ is bubbled into the mixture. The contacting of catalyst, initiator and monomer can occur before or after the polymerizate reaches the reaction zone. Although the in situ method is preferred, it is also possible to make and separate an adduct of $CO_2$ and an alkaline polymerization catalyst such as potassium pyrrolidonate. The adduct is then added to the reaction mixture to effect polymerization. Such catalyst adducts comprise adducts of alkali metal salts of 2-pyrrolidone and caprolactam with $CO_2$.

The total alkaline polymerization catalyst comprises from about 0.5 to 30 mol percent, or higher, of the monomer-catalyst mixture, based on total monomer. Preferably about 5–20 mol percent, and most preferably about 10 mol percent catalyst is used. Total monomer consists of 2-pyrrolidonate catalyst, 2-pyrrolidone provided as solvent for said catalyst, 2-pyrrolidonate catalyst having formed an adduct with the initiator and any additional monomer charged to the reaction zone.

A polymerization initiator is normally used in amounts sufficient to effect substantial conversion and reasonable yields of high viscosity polymer is a reasonable period of time. Up to 0.2 mol of initiator per mol of monomer is used, but normally about 0.02–10 mol percent initiator, based on total monomer, is preferred, and about 1–5 mol percent is most preferred. When used as co-initiators, compounds such as N-acyl pyrrolidone, phthalic anhydride, pyromellitic dianhydride, $CS_2$, ethylene carbonate and trifluoromethane sulfonic anhydride, in amounts of about 0.01–0.02 mol percent, based on total monomer, may accelerate the polymerization of 2-pyrrolidone.

2-pyrrolidone may be polymerized at a temperature of from about 18° C to about 100° C, preferably from 25° C to about 70° C, and most preferably from about 40° C to about 60° C, under a pressure ranging from subatmospheric to superatmospheric, in the presence of the alkaline polymerization catalyst for a period of from 1 to about 100 hours, or longer, preferably from about 8 to about 72 hours, and more preferably from about 8 to about 48 hours. The polymerization may be conducted in batch, semicontinuously or in continuous processing. In continuous operation polymerization times refer to plug flow conditions. It is recognized that longer polymerization times may be required in continuous reactors exhibiting some degree of back mixing.

Substantially anhydrous polymerization conditions are preferred, i.e., a slight amount of water, not exceeding about 0.1–0.2 percent by weight based on total monomer is permissible, but less than 0.1 weight percent water is preferred.

Generally, the present process for polymerizing 2-pyrrolidone can be carried out by any substantialy anhydrous alkaline-catalyzed polymerization technique which yields a substantially particulate or granular solid poly-2-pyrrolidone, or a solid poly-2-pyrrolidone capable of being comminuted, whether that technique is characterized as dispersion polymerization, suspension polymerization, bulk polymerization, precipitation polymerization, solution polymerization, or another. The polymerization may be accomplished either in batch, semi-continuously or continuously, the latter being preferred.

In one embodiment the polymerization is carried out in the presence of an inert (non-reactive) substantially anhydrous diluent which is a nonsolvent for 2-pyrrolidone as well as poly-2-pyrrolidone. The amount of diluent employed will vary from 0–500 weight percent based on the weight of 2-pyrrolidone, preferably from 20–500 weight percent, and most preferably from 40–500 weight percent. The diluent serves the purpose of preventing appreciable agglomeration of polymer into hard solid masses. Typical diluents include, in addition to heptane and hexane, cyclohexane, octane, isooctane, petroleum fractions such as kerosene, aliphatic mineral oil, gasoline, and other saturated and unsaturated nonaromatic liquid hydrocarbons and mixtures thereof. The $C_5$–$C_{10}$ saturated hydrocarbons, such as hexane, pentane, isooctane and cyclohexane are preferred. It is generally preferred that the reaction be carried out in the absence of protic solvents, especially water.

Preferably the product is obtained as a particulate or granular material. For greater efficiency in countercurrent washing of the product, it is desirable that no linear dimension of the polymer particle be greater than about ¼ on the average in any direction. Excessive fineness may lead to take-off of particulate with the overflow, so preferably no dimension of the polymer particle should be less than about 0.005 inches on the average.

The solid polypyrrolidone obtained as product of polymerization will vary from fine powder to heavy flakes or granules, or a thick curd, depending upon the degree of conversion, the amount and type of agitation and the ratio of diluent to 2-pyrrolidone. For more rapid monomer and catalyst removal and ease of processing, the preferred reaction conditions are those providing a particulate product of average maximum and minimum linear dimension enumerated above, or that passing a mesh (U.S. Standard Sieve) of from about 3 to about 10, preferably passing a mesh of from about 8 to about 10, and being retained on a mesh of from about 60 to about 200, preferably retained on a mesh of from about 60 to about 120.

Preparation of poly-2-pyrrolidone, according to the novel process of this invention, can be carried out with various amounts of monomers, catalysts, diluents, initiators and other additives — the amount of each being properly coordinated to produce the most effective polymerization. Although the preferred amounts of the components in the reaction mixture are given, it is to be understood that these are not intended to be limitations to polymerization, since it may be possible to effect substantial polymerization outside the preferred ranges. Product whiteness, polymer viscosity and melt spinnability (U.S. Pat. No. 3,721,652) are also very important considerations in the choice of preferred process parameters.

Usually, but not necessarily, a reactor with agitating means constitutes the reaction zone in the process of the present invention. Such reactors include mechanically stirred reactors, reactors with Brabender attachments, ball mill reactors and others capable of producing agitation of the reaction mass during polymerization. A ball mill reactor has been used, but others may be used as well. In a typical ball mill reactor, the polymerizate and diluent are charged to a cylinder partly filled with small objects such as balls or cylinders made from an inert material such as stainless steel, glass, or a ceramic material. The cylinder is rotated about its axis as the polymerization reaction proceeds at the desired temperature.

When it is desirable to separate the solid product from diluent and other liquid phase components of the reaction mixture before continued processing, the solid product may be separated by any convenient means such as filtration or centrifugation. In continuous operation with a diluent, the diluent normally being less dense than the solid product, said product separates gravimetrically at a rate and particle size controllable by process conditions, including the rate of agitation. The selection of separating means, or process conditions effecting continuous separation of the solid product, is considered well within the skill of ordinary workers in this art.

If necessary, the solid product is comminuted to granules by the usual means of chopping, cutting or grinding, all of which are adaptable to continuous operation.

In the novel improved process of the present invention, the particulate solid product, or comminuted solid, is washed with 2-pyrrolidone. This washing step recovers two streams; a first stream of polymer substantially free of catalyst and a second stream containing 2-pyrrolidone and catalyst. Washing the product serves to extract catalyst and other low-molecular-weight components of the reaction mixture. By washing with monomer, the monomer wash stream (second stream) may be returned to the reaction zone, thereby preventing appreciable catalyst or monomer loss, as would occur in a simple aqueous washing process. Such an extraction can be performed discontinuously in large washing containers, or continuously in extraction columns or other contacting device. In a typical continuous process, the solid product is introduced as a granulate into an extraction column at the top, and 2-pyrrolidone enters at the bottom and flows upwardly in a counterflow to the granules. At the bottom of the extraction column, the granulate, substantially freed of low-molecular-weight components, is discharged while the 2-pyrrolidone, now charged with catalyst and other low-molecular-weight components, is drawn off at the upper end of the extraction column. The 2-pyrrolidone acts as a solvent for the low-molecular-weight components, but is not a solvent for poly-2-pyrrolidone. The 2-pyrrolidone may be heated before or during extraction to a temperature of from about 30° to about 60° C. for more effective washing. Contact times of 0.5–20 hours in continuous countercurrent contacting are preferred. In preferred operations, the weight ratio of hourly feed of 2-pyrrolidone to solid product granules is correlated with contact time of the 2-pyrrolidone and the granules at a given temperature to optimize the desired low levels of extractable materials in the polymer stream. Residual 2-pyrrolidone may be separated from the polymer by vaporization or aqueous washing.

The wash stream exiting from the extraction column or the washing container may be returned to the reaction zone for polymerization, thereby directly recycling catalyst, diluent and excess monomer. If necessary, a portion of the recycle wash stream may be withdrawn to prevent impurities from concentrating in the recycle stream. Makeup quantities of catalyst, diluent, initiator and monomer are added as needed to the reactor to continue polymerization under optimum conditions.

When alkaline polymerization catalysts containing metal ions are used, the concentration of metallic ion in the dried polymer product is indicative of the amount of catalyst residue in the product. Similar analytical methods may be chosen for other catalysts. The amount of residue catalyst in the dried polymeric product after a given extraction process depends on the amount of catalyst originally present, the particle size of the product and the degree of conversion of monomer to polymer as well as the nature and conditions of the extraction process. For purposes of the process of the present invention, the polymer is said to be substantially free of catalyst when about 90–95 percent by weight, or more, of the total alkaline polymerization catalyst present in the monomer-catalyst mixture prior to polymerization has been removed. For example, in the case of a potassium catalyst this corresponds to less than one weight percent potassium residue in the dried polymeric product (depending on the amount of catalyst used in the polymerization and the degree of conversion of monomer), preferably less than 0.5 weight percent and most preferably less than 0.1 weight percent potassium.

The figure is a flow diagram illustrating an embodiment of the process of this invention in which polypyrrolidone is produced by bulk polymerization. In this process crude 2-pyrrolidone in line 1 is combined with recycle 2-pyrrolidone in line 3, and charged to a monomer purification zone 2. The 2-pyrrolidone is topped in zone 2, low boiling impurities are removed through line 4 and high boiling impurities through line 5. The purified 2-pyrrolidone then passes through lines 6 and 14 into the separation and catalyst extraction zone 16, except for a small fraction of the monomer (1–20 weight percent) which passes through line 7 into the make-up catalyst preparation zone 10. In zone 10 potassium hydroxide is added through line 8 and the catalyst-containing solution is then passed through line 28 into the water separation zone 12 wherein water is removed by distillation at reduced pressure through line 11. To the dried make-up catalyst solution is added carbon dioxide via line 9. The make-up catalyst solution in line 13 is then combined with the catalyst-containing monomer stream from line 15, and the combined streams are charged to the polymerization zone 29 via line 30. The polymerization zone comprises 1 or more reactors, e.g., tanks, stirred reactors, ball mills, brabenders, etc., wherein the temperature is maintained within the range of 18° C to about 100° C. The period of polymerization is from about 4 to 100 hours. The crude reaction mixture containing solid product, unreacted monomer and active catalyst, passes to the separation and catalyst extraction zone 16 via line 17. The separation and catalyst extraction zone comprises a vessel, e.g., a counter-current extractor, wherein the fresh monomer extracts the active catalyst from the solid product, forming a catalyst-containing monomer stream which may be recycled back to the polymerization zone via lines 15 and 30. The separated solid product from which substantial amounts of catalyst have been extracted, passes via line 18 into an extraction zone 19 wherein monomer and catalyst residues are removed by extraction with water introduced through line 20. The polymer then passes through line 21 into a drying zone 22 where residual water is removed through line 23. The product polymer is recovered at 24. The water extracts of the polymer pass through line 25 into a distillation zone 26 where the water is stripped off through line 27. The dry monomer is recycled through line 3 back to the monomer purification zone 2.

EXAMPLES

The success of the process of the present invention depends on the continued activity of the catalyst in the polymerization reaction, and the extractability of the catalyst from the solid product. The demonstration of continued catalyst activity is shown by the following example wherein polymerization of fresh monomer takes place after contact with the unextracted solid reaction product.

EXAMPLE 1

Into a ball mill reactor consisting of a horizontally mounted rotatable vessel of 1 liter capacity containing ceramic cylinders 12 mm in diameter and 12 mm in height and having a total volume of 430 ml was charged 200 ml of heptane and 99.2 g of a 2-pyrrolidone solution containing 7 mol pecent potassium pyrrolidonate and 3 mol percent of an adduct of carbon dioxide and potassium pyrrolidonate, based on total monomer. The reactor was rotated for 22 hours at 48° C. At the end of this time the reactor was opened and a second batch of monomer consisting of a mixture of 100 g of 2-pyrrolidone and 200 ml of heptane was added. Rotation of the ball mill reactor was continued for an additional 22 hours at 48° C. At the end of this additional time the mixture comprising heptane, unreacted monomer, catalyst and particulate solid product was filtered to separate the product. The product was then washed with water to remove unreacted monomer and dried. The product poly-2-pyrrolidone weighed 105.3 g, corresponding to a yield of 54.5 percent based on total 2-pyrrolidone charged. A control polymerization was carried out for purposes of comparison by charging 52.7 g of a 2-pyrrolidone solution containing 7 mol percent potassium pyrrolidonate and 3 mol percent of the $CO_2$ adduct of potassium pyrrolidonate to a polyethylene bottle and reacting the same at 48° C for 44 hours (U.S. Pat. No. 3,721,652), giving a poly-2-pyrrolidone yield of 60.5 percent. Therefore, the second batch of monomer charged to the ball mill reactor was polymerized to essentially the same extent as the first batch of 2-pyrrolidone, showing that the catalyst retained its full activity after the first 22 hour polymerization.

The extractability of the catalyst from the solid product is shown in the following example.

EXAMPLE 2

Into the ball mill reactor of Example 1 was charged 200 ml of heptane and 47.2 g of 2-pyrrolidone solution containing 7 mol percent potassium pyrrolidonate and 3 mol percent of an adduct of carbon dioxide and potassium pyrrolidonate. The reactor was rotated at 48° C for 22 hours. At the end of this time the solid product was separated by successive filtrations. The yield was 50.1 percent. The product was divided into 2 equal parts. The first fraction, 20.3 g, was stirred with 100 g of 2-pyrrolidone in a Waring blender for 30 minutes. The second fraction of 20.2 g was stirred in a Waring blender for 30 minutes with 100 g of water. Each product fraction was then separated from its extractant by filtration and analyzed for potassium. It was found that the 2-pyrrolidone had extracted about 23 percent of the catalyst from the product fraction whereas the water had extracted about 97 percent of the catalyst from the product fraction. The experiment shows that a significant fraction of the catalyst can be extracted from the polymeric product by a single 30-minute contacting with monomer. Multiple or continuous 2-pyrrolidone extractions by the aforementioned techniques permit recovery of most of the catalyst from the polymer for use in recycle and provide a polymeric product substantially free of catalyst.

What is claimed is:

1. A process for producing 2-pyrrolidone polymer which comprises the steps of polymerizing 2-prrolidone under substantially anhydrous conditions in a reaction mixture comprising monomer, polymerization initiator and alkaline polymerization catalyst at a temperature of from abou 18° to about 100° C for a period of from about 4 to about 100 hours to produce a solid polymeric product, and washing said solid polymeric product with 2-pyrrolidone to recover a first stream containing polymer, substantially free of said catalyst, and a second stream containing 2-pyrrolidone and catalyst.

2. A process according to claim 1 wherein said second stream containing 2-pyrrolidone and catalyst is recycled into the polymerization reaction.

3. The process according to claim 1 wherein said alkaline polymerizaion catalyst is derived from a source of alkali metal or a quaternary ammonium hydroxide.

4. A process according to claim 3 wherein said source of alkali metal is selected from the group consisting of alkali metals, alkali metal hydroxide, alkali metal carbonates, alkali metal hydrides, and alkali metal alkoxides.

5. The process according to claim 4 wherein said alkaline polymerization catalyst is derived from potassium hydroxide.

6. In a process for polymerizing 2-pyrrolidone comprising the steps of charging to a reactor with agitating means monomer, alkaline polymerization catalyst, polymerization initiator and 40–500 weight percent of diluent based on total monomer to form a liquid reaction mixture, wherein said diluent is an inert substantially anhydrous nonsolvent for 2-pyrrolidone and poly-2-pyrrolidone, agitating said liquid reaction mixture at a temperature of from 18 to 100° C for a period of from 4 to 100 hours to form a solid polymeric product, and separating said solid polymeric product from said reaction mixture, the improvement comprising the step of washing said solid polymeric product with 2-pyrrolidone to remove catalyst from said solid polymeric product, and sending the wash containing catalyst and 2-pyrrolidone to the reactor for polymerization.

* * * * *